United States Patent
Ruobiao et al.

(10) Patent No.: US 7,675,275 B2
(45) Date of Patent: Mar. 9, 2010

(54) DC-DC CONVERTER

(75) Inventors: Luo Ruobiao, Kawasaki (JP); Kaoru Ozaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 314 days.

(21) Appl. No.: 11/870,155

(22) Filed: Oct. 10, 2007

(65) Prior Publication Data

US 2008/0088283 A1    Apr. 17, 2008

(30) Foreign Application Priority Data

Oct. 10, 2006   (JP)  ............................. P2006-276130

(51) Int. Cl.
  *G05F 1/40*   (2006.01)
  *G05F 1/56*   (2006.01)
(52) U.S. Cl. ...................... 323/271; 323/285
(58) Field of Classification Search ......... 323/222–225, 323/268, 271, 282–285, 349–351
  See application file for complete search history.

(56) References Cited

U.S. PATENT DOCUMENTS

| | | | |
|---|---|---|---|
| 6,853,174 B1 | 2/2005 | Inn | |
| 6,933,706 B2 * | 8/2005 | Shih | 323/222 |
| 6,954,055 B2 | 10/2005 | Umemoto et al. | |
| 7,492,135 B2 * | 2/2009 | Saeki et al. | 323/271 |
| 2005/0285579 A1 | 12/2005 | Yasukouchi et al. | |
| 2007/0285077 A1 * | 12/2007 | Hasegawa | 323/351 |

FOREIGN PATENT DOCUMENTS

| | | |
|---|---|---|
| JP | 2004-023846 | 1/2004 |
| JP | 2006-014482 | 1/2006 |

* cited by examiner

*Primary Examiner*—Matthew V Nguyen
(74) *Attorney, Agent, or Firm*—Turocy & Watson, LLP

(57) ABSTRACT

According to an aspect of the present invention, there is provided a DC-DC converter including a high-side transistor, a low-side transistor, a first current detector, a second current detector and a driver. The first current detector monitors a first current flowing through the high-side transistor and outputs a first control signal when the first current becomes smaller than a first reference value. The second current detector monitors a second current flowing through the low-side transistor and outputs a second control signal when the second current becomes smaller than a second reference value. The driver turns on the low-side transistor based on the first control signal and turns on the high-side transistor based on the second control signal.

14 Claims, 8 Drawing Sheets

DC-DC CONVERTER

CROSS-REFERENCE TO RELATED APPLICATIONS

The entire disclosure of Japanese Patent Application No. 2006-276130 filed on Oct. 10, 2006 including specification, claims, drawings and abstract is incorporated herein by reference in its entirety.

BACKGROUND OF THE INVENTION

1. Field of the Invention

An aspect of the present invention relates to a DC-DC converter.

2. Description of the Related Art

As power circuits, there are provided synchronous rectification DC-DC converters that output a PWM (pulse width modulation)-controlled DC voltage by using a high-side transistor and a low-side transistor that are connected to each other in series and provided between a power supply voltage and a reference potential. To generate the PWM-controlled DC voltage, the high-side transistor and the low-side transistor are alternately turned on/off state. The on state periods of the transistors are controlled according to variations of a load and an input voltage.

As for the on/off switching timing, if there exists a period when both of the high-side transistor and the low-side transistor are turned on, a flow-through current occurs and the conversion efficiency is lowered. In view of this, the switch-on timing of each of the high-side transistor and the low-side transistor is delayed to provide a period (dead time) when both of them are turned off.

As a conventional method for delaying the switch-on timing of each of the high-side transistor and the low-side transistor, there is provided a delay circuit utilizing the CR time constant of a capacitor C and a resistor R. However, since a certain time is taken to charge or discharge the capacitor C, it is difficult to attain high-speed switching.

Additionally, since an inverter or a buffer used in the delay circuit have a variation in the threshold value, the dead time set by taking into account the variation.

On the other hand, a method is known which reliably prevents occurrence of a period when both of the high-side transistor and the low-side transistor are turned on, independently of the type or characteristic of a device (refer to JP-2004-23846-A, for example).

A DC-DC converter disclosed in JP-2004-23846-A has detecting sections that detects the on/off states of body diodes of a high-side field-effect transistor and of a low-side field-effect transistor, respectively. The on states of the high-side field-effect transistor and the low-side field-effect transistor are controlled so that an output corresponding to an input signal is output after detecting that one of the body diodes has been turned on.

However, the DC-DC converter disclosed in JP-2004-23846-A has the following problems. In a process that a field-effect transistor makes a transition from an on state to an off state, it is difficult to detect a change to the off state of the field-effect transistor until the impedance of the field-effect transistor becomes sufficiently high and the accompanying body diode makes a sufficient degree of transition to an on state. This results in a problem that the conversion efficiency lowers particularly in the case of high-frequency switching.

SUMMARY OF THE INVENTION

According to an aspect of the present invention, there is provided a DC-DC converter including: a first transistor connected to a high-potential power supply; a second transistor connected to a low-potential power supply; a first current detector that monitors a first current flowing through the first transistor and that outputs a first control signal when the first current becomes smaller than a first reference value; a second current detector that monitors a second current flowing through the second transistor and that outputs a second control signal when the second current becomes smaller than a second reference value; and a driver that turns on the second transistor based on the first control signal and that turns on the first transistor based on the second control signal.

According to another aspect of the present invention, there is provided a DC-DC converter including: an inductor; a first transistor connected to a high-potential power supply via the inductor; a second transistor connected to a low-potential power supply; a first current detector that monitors a first current flowing through the first transistor and that outputs a first control signal when the first current becomes smaller than a first reference value; a second current detector that monitors a second current flowing through the second transistor and that outputs a second control signal when the second current becomes smaller than a second reference value; and a driver that turns on the second transistor based on the first control signal and that turns on the first transistor based on the second control signal.

According to still another aspect of the present invention, there is provided a DC-DC converter including: a first transistor connected to a high-potential power supply; a second transistor connected to a low-potential power supply; a receiver that receives: a first signal capable of turn off the first transistor and turn on the second transistor; a second signal capable of turn off the second transistor and turn on the first transistor; a first path that transmits the first signal from the receiver to the second transistor via the first transistor; and a second path that transmits the second signal from the receiver to the first transistor via the second transistor; wherein: the first path includes: a first delaying element that delays an transmission of the first signal, and a first phase-advancing element that advances the transmission of the first signal; and the second path includes: a second delaying element that delays an transmission of the second signal, and a second phase-advancing element that advances the transmission of the second signal.

BRIEF DESCRIPTION OF THE DRAWINGS

Embodiment may be described in detail with reference to the accompanying drawings, in which.

DETAILED DESCRIPTION OF THE INVENTION

Embodiments will be hereinafter described with reference to the drawings.

FIRST EMBODIMENT

Figure 1:
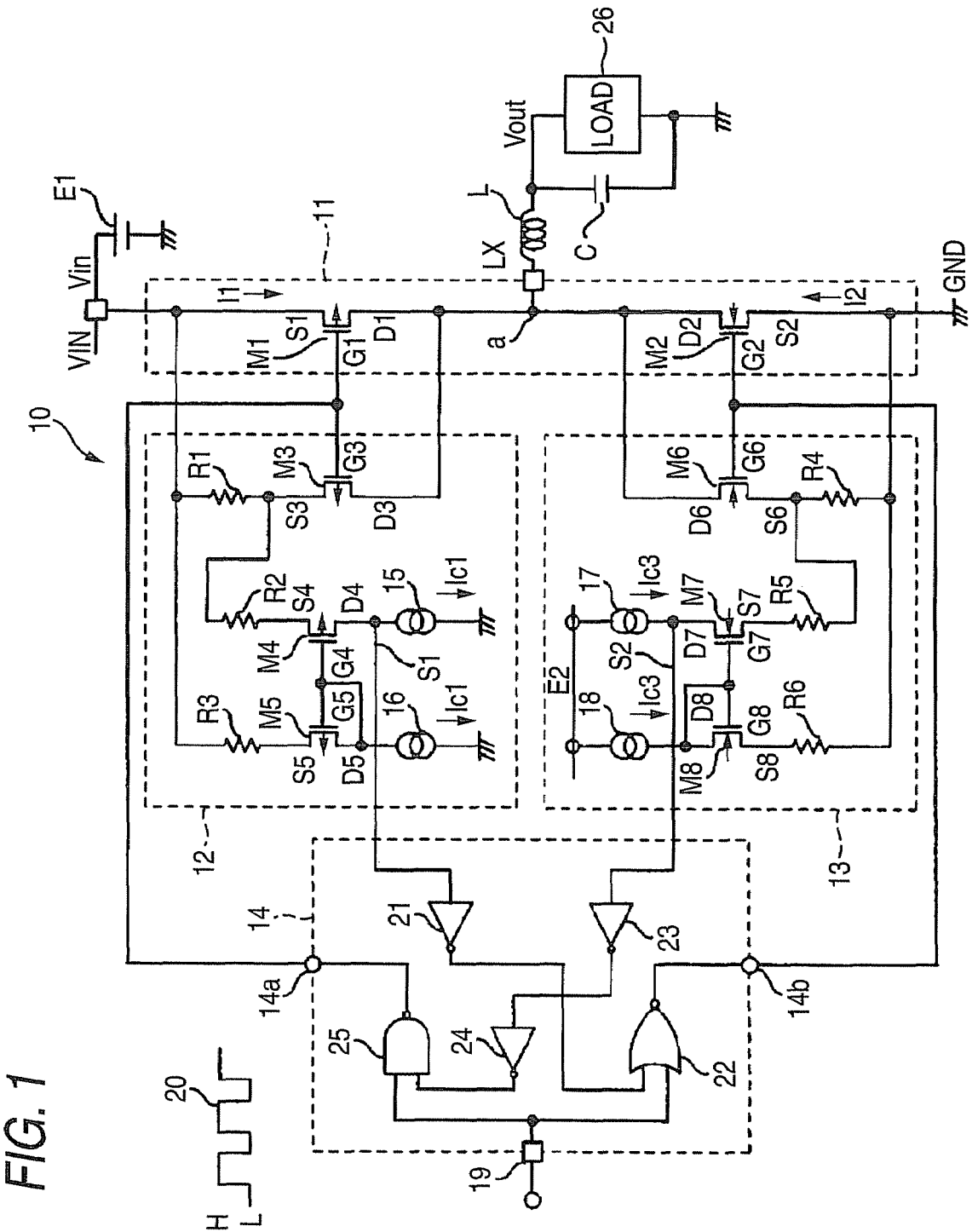
FIG. 1 is a circuit diagram showing the configuration of a DC-DC converter according to a first embodiment.
Figure 2:
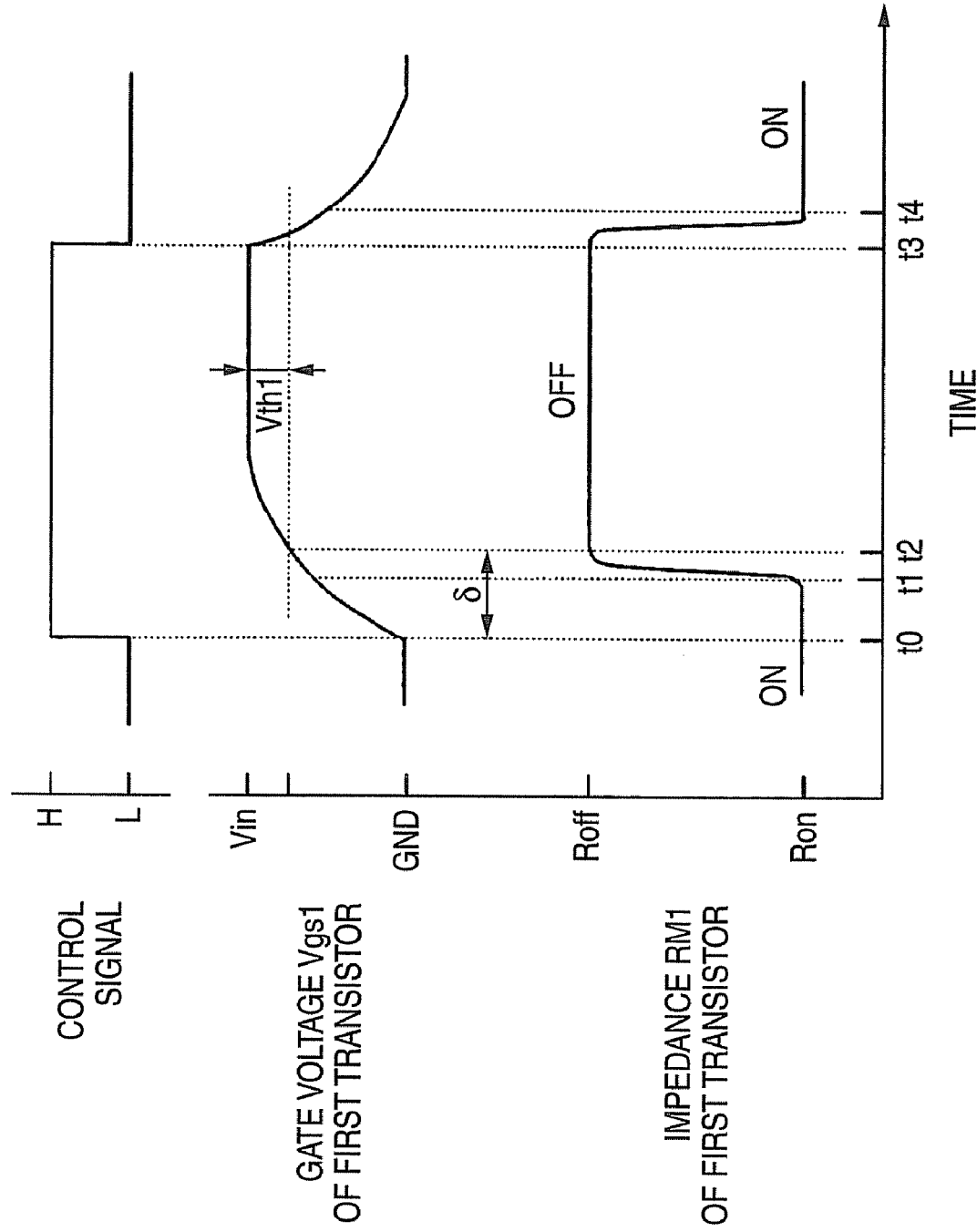
FIG. 2 is a chart showing a delay characteristic of a transistor of the DC-DC converter according to the first embodiment.
Figure 3:
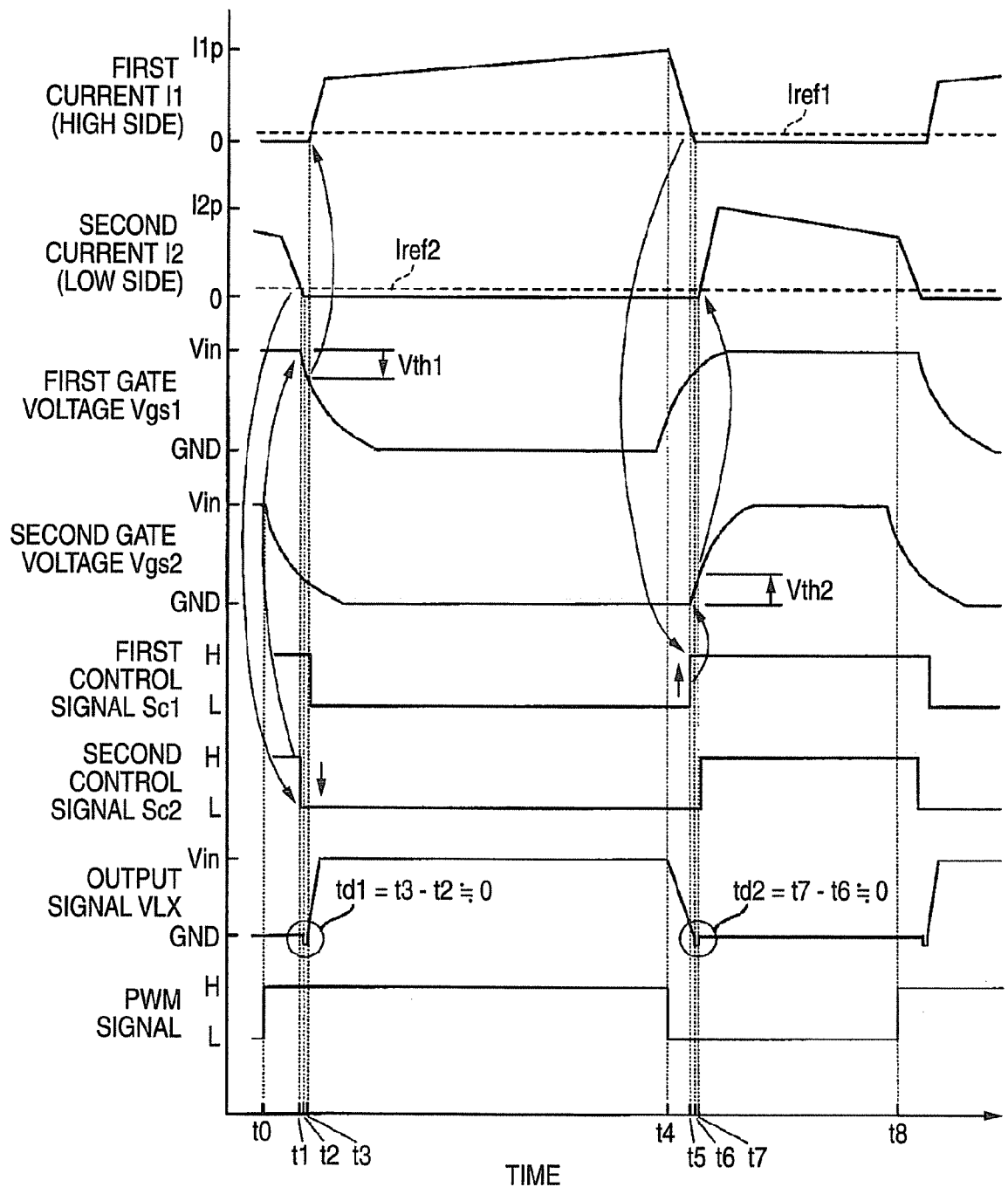
FIG. 3 is a timing chart showing the operation of the DC-DC converter according to the first embodiment.
Figure 4:
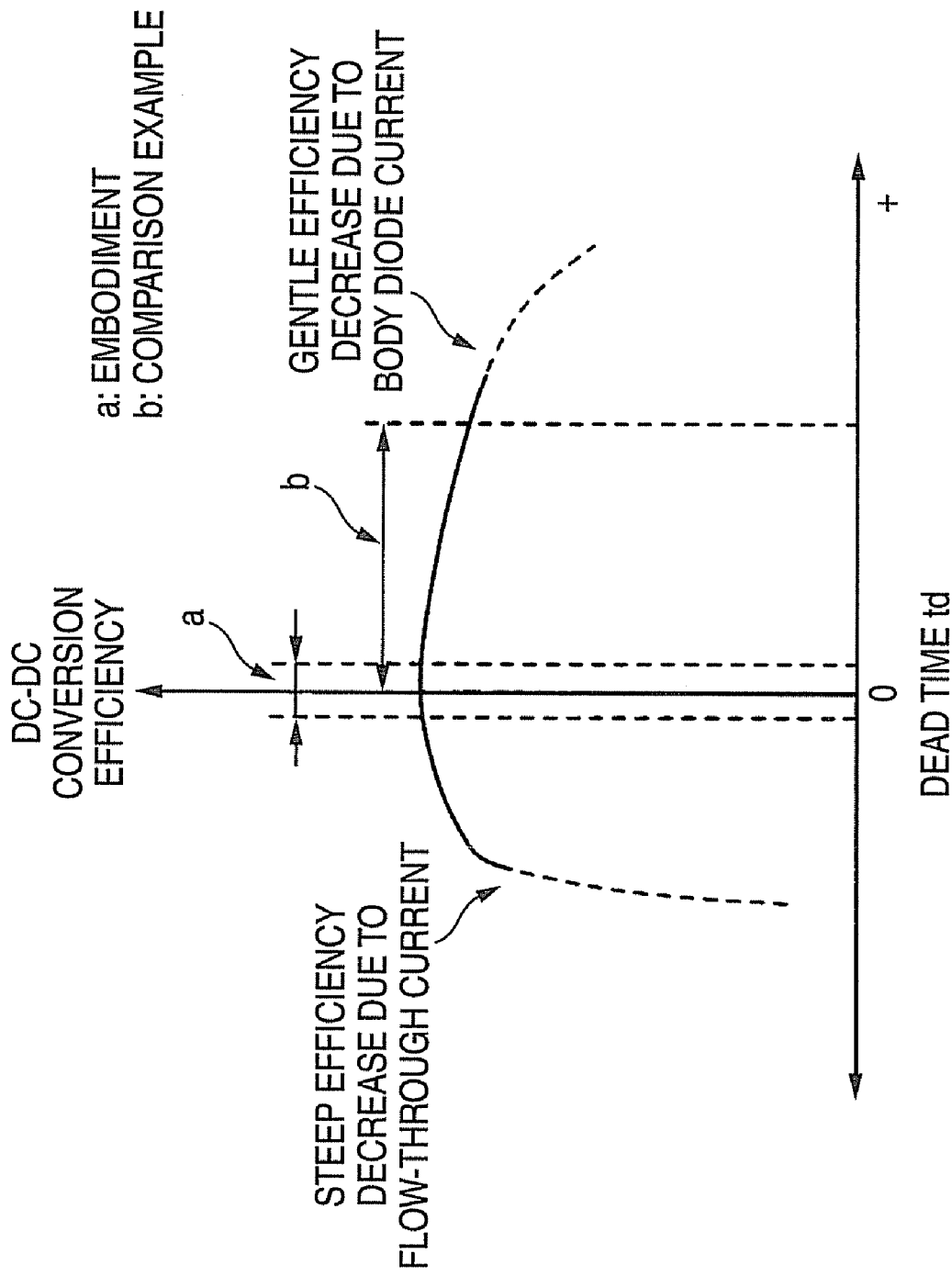
FIG. 4 is a chart illustrating a dead time of the DC-DC converter according to the first embodiment in comparison with that of a comparison example.

A DC-DC converter according to a first embodiment will be described below with reference to FIGS. 1-4. FIG. 1 is a circuit diagram of the DC-DC converter according to the first embodiment. FIG. 2 is a chart showing a delay characteristic of a transistor of the DC-DC converter. FIG. 3 is a timing chart showing the operation of the DC-DC converter. FIG. 4 is a chart illustrating a dead time of the DC-DC converter in comparison with that of a comparison example.

As shown in FIG. 1, a DC-DC converter 10 according to this embodiment includes an output section 11 having a first transistor (high-side transistor) M1 and a second transistor (low-side transistor) M2 which are connected to each other in series and provided between an input power source E1 and a reference potential GND, a first current detecting section 12 which monitors a first current I1 flowing through the first transistor M1 and outputs a first control signal for turning on the second transistor M2 if the first current I1 becomes smaller than a first reference value, a second current detecting section 13 which monitors a second current I2 flowing through the second transistor M2 and outputs a second control signal for turning on the first transistor M1 if the second current I2 becomes smaller than a second reference value, and a drive section 14 which turns off the first transistor M1 and turns on the second transistor M2 in response to the first control signal and also turns off the second transistor M2 and turns on the first transistor M1 in response to the second control signal.

For example, the first transistor M1 of the output section 11 is a p-type insulated-gate field-effect transistor (hereinafter referred to as "p-MOS transistor"), and the second transistor M2 is an n-type insulated-gate field-effect transistor (hereinafter referred to as "n-MOS transistor"). The first transistor M1 and the second transistor M2 have what is called a totem-pole connection.

More specifically, the source S1 of the first transistor M1 is connected to an input power supply terminal VIN, the drain D1 of the first transistor M1 is connected to the drain D2 of the second transistor M2, a connection node a of the drain D1 of the first transistor M1 and the drain D2 of the second transistor M2 is connected to an output terminal LX, and the source S2 of the second transistor M2 is connected to the ground potential GND.

The gate G1 of the first transistor M1 is connected to an output terminal 14a of the drive section 14. The gate G2 of the second transistor M2 is connected to an output terminal 14b of the drive section 14.

The first current detecting section 12 includes a third transistor M3 (p-MOS transistor) whose gate G3 (control electrode) and drain D3 (first electrode) are connected to the gate G1 and the drain D1 of the first transistor M1, respectively, and whose source S3 (second electrode) is connected to the source S1 of the first transistor M1 via a first resistor R1, a fourth transistor M4 (p-MOS transistor) whose drain D4 is connected to the reference potential GND via a first constant current source 15 and whose source S4 is connected to the source S3 of the third transistor M3 via a second resistor R2, and a fifth transistor M5 whose drain D5 is connected to the reference potential GND via a second constant current source 16, whose source S5 is connected to the source S1 of the first transistor M1 via a third resistor R3, and whose gate G5 is connected to its own drain D5 and the gate G4 of the fourth transistor M4.

The second current detecting section 13 includes a sixth transistor M6 (n-MOS transistor) whose gate G6 and drain D6 are connected to the gate G2 and the drain D2 of the second transistor M2, respectively, and whose source S6 is connected to the source S2 of the second transistor M2 via a fourth resistor R4, a seventh transistor M7 (n-MOS transistor) whose drain D7 is connected to a power source E2 via a third constant current source 17 and whose source S7 is connected to the source S6 of the sixth transistor M6 via a fifth resistor R5, and an eighth transistor M8 whose drain D8 is connected to the power source E2 via a fourth constant current source 18, whose source S8 is connected to the source S2 of the second transistor M2 via a sixth resistor R6, and whose gate G8 is connected to its own drain D8 and the gate G7 of the seventh transistor M7.

The drive section 14 includes a NOR circuit 22 which receives an input PWM signal 20 from a drive signal input terminal 19 and also receives the first control signal from the first current detecting section 12 via an inverter 21 and a NAND circuit 25 which receives the PWM signal 20 and also receives the second control signal from the second current detecting section 13 via inverters 23 and 24.

A smoothing circuit which consists of an inductor L and a capacitor C and smoothes a PWM-controlled DC voltage which is output from the output section 11 is connected to the output terminal LX. For example, when the voltage Vin of the input power source E1 is 3 to 5 V, the smoothing circuit supplies a load 26 with a smoothed output voltage Vout of about 1.2 to 3.3 V.

For example, the first transistor M1 of the output section 11 and the third transistor M3 of the first current detecting section 12 are pair transistors which have common gates G1 and G3, common drains D1 and D3, and sources S1 and S3 being different in area and which are produced in the same chip by the same process.

When a voltage is applied to the common gates G1 and G3, currents flow through the first transistor M1 and the third transistor M3 at a ratio that is equal to the area ratio of the sources S1 and S3. For example, where the area ratio of the sources S1 and S3 is 1000:1, a current of 1 mA flows through the third transistor M3 when a current of 1 A flows through the first transistor M1.

The area of the source is adjusted, for example, by adjusting the gate width of the transistor. Plurality of the transistors having the same gate length may be used to change the effective gate width.

The same is true of the second transistor M2 of the output section 11 and the sixth transistor M6 of the second current detecting section 13.

Next, the operation of the DC-DC converter 10 will be described.

First, a description will be made of an operation that when the PWM signal 20 is switched from L to H, the second transistor (low-side transistor) M2 makes an on-to-off transition and the first transistor (high-side transistor) M1 makes an off-to-on transition.

Since the seventh transistor M7 and the eighth transistor M8 are current-mirror-connected, the same current Ic3 flows through the third constant current source 17 and the fourth constant current source 18.

When the PWM signal 20 is switched from L to H, the output of the NOR circuit 22 is fixed at L and hence the second transistor (low-side transistor) M2 and the sixth transistor M6 of the second current detecting section 13 make an on-to-off transition.

Then, the voltage drop across the fourth resistor R4 decreases and the potential difference between the gate G7 and the source S7 of the seventh transistor M7 increases, whereby the drain current of the seventh transistor M7 increases.

Since the drain current of the seventh transistor M7 is forced to be approximately the same current as the current Ic3 by the third constant current source 17, the drain voltage of the seventh transistor M7 is increased, and an H-level second control signal Sc2 is output to the drive section 14.

When the second control signal Sc2 is switched from L to H, the output of the buffer inverter 23 is changed from H to H and the output of the signal adjustment inverter 24 is changed from L to H.

Since the other input of the NAND circuit 25 is H, both inputs of the NAND circuit 25 become H and the output of the NAND circuit 25 is changed from H to L. As a result, both of the first transistor (high-side transistor) M1 and the third transistor M3 of the first current detecting circuit 12 make an off-to-on transition.

Next, a description will be made of an operation that when the PWM signal 20 is switched from H to L, the second transistor (low-side transistor) M2 makes an off-to-on transition and the first transistor (high-side transistor) M1 makes an on-to-off transition.

Since the fourth transistor M4 and the fifth transistor M5 are current-mirror-connected, the same current Ic1 flows through the first constant current source 15 and the second constant current source 16.

When the PWM signal 20 is switched from H to L, the output of the NAND circuit 22 is fixed at H and hence the first transistor (high-side transistor) M1 and the third transistor M3 of the first current detecting section 12 make an on-to-off transition.

Then, the voltage drop across the first resistor R1 decreases and the potential difference between the gate G4 and the source S4 of the fourth transistor M4 increases, whereby the drain current of the fourth transistor M4 increases.

Since the drain current of the fourth transistor M4 is forced to be approximately the same current as the current Ic1 by the first constant current source 15, the drain voltage of the fourth transistor M4 is increased, and an H-level first control signal Sc1 is output to the drive section 14.

When the first control signal Sc1 is changed from L to H, the output of the buffer/signal adjustment inverter 23 is changed from H to L.

Since the other input of the NOR circuit 22 is L, both inputs of the NOR circuit 22 become L and the output of the NOR circuit 22 is changed from L to H. As a result, both of the second transistor (low-side transistor) M2 and the sixth transistor M6 of the second current detecting circuit 13 make an off-to-on transition.

The output signal VLX has a voltage that is the voltage Vin of the input power source E1 minus an on-voltage Vds1 of the first transistor M1, that is, Vin−Vds1, during a period when the first transistor M1 is on and the second transistor M2 is off. And the output signal VLX has a voltage that is equal to an on-voltage Vds2 of the second transistor M2 during a period when the first transistor M1 is off and the second transistor M2 is on.

During a dead time when both of the first and second transistors M1 and M2 are off, the energy stored in the inductor L is released to cause a flow of a regenerative current through the body diode of the second transistor M2. Therefore, the output signal VLX has a voltage that is equal to a forward voltage −Vf of the body diode.

As shown in FIG. 2, even when a control signal for turning off the first transistor M1 is input to it at time t0, the gate voltage Vg1 of the first transistor M1 does not vary quickly but increases depending on the time constant of the gate capacitance etc.

When the gate-source voltage Vgs1 of the first transistor M1 becomes close to its threshold voltage Vth1 at time t1, the current I1 flowing through the first transistor M1 starts to decrease. After the gate-source voltage Vgs1 becomes equal to the threshold voltage Vth1 at time t2, the current I1 decreases steeply.

As a result, from time t0 to time t1, the impedance RM1 of the first transistor M1 becomes an on-state impedance Ron that is 1 to 100 mΩ and increases steeply to an off-state impedance Roff that is about several megaohms after time t1. Therefore, a turn-off delay δ=t2−t0 occurs from the application of the control signal to the turning-off of the first transistor M1.

Next, the operation of the DC-DC converter 10 will be described in detail with reference to a timing chart.

As shown in FIG. 3, when the PWM signal 20 is switched from L to H at time t0, the second transistor (low-side transistor) M2 makes an on-to-off transition. Therefore, the second current I2 decreases according to the turn-off delay characteristic of the second transistor M2.

Then, at time t1 when the second current I2 becomes equal to a second reference value Iref2 which is smaller than or equal to, for example, 1/100 of a peak second current I2p of the second transistor M2, the second control signal Sc2 is changed from H to L.

Then, at time t2, the second current I2 of the transistor M2 becomes zero.

During that course, when the second control signal Sc2 is changed from H to L, the gate voltage Vg1 of the first transistor (high-side transistor) M1 starts to decrease from the power supply voltage Vin. The first transistor M1 is turned on and the first current I1 starts flow through it at time t3 when the gate voltage Vg1 of the first transistor M1 has decreased by its threshold voltage Vth1.

From time t2 to time t3, no flow-through current flows through the first and second transistors M1 and M2 because both of the first current I1 of the first transistor M1 and the second current I2 of the second transistor M2 are zero and a dead time td1=t3−t2 occurs.

Then, at time t4 when the PWM signal 20 is switched from H to L, the first transistor (high-side transistor) M1 makes an on-to-off transition and hence the first current I1 decreases according to the turn-off delay characteristic of the first transistor M1.

Then, at time t5 when the first current I1 becomes equal to a first reference value Iref1 which is smaller than or equal to, for example, 1/100 of a peak first current I1p of the first transistor M1, the first control signal Sc1 is changed from L to H.

In response to this trigger signal, the gate-source voltage Vgs2 of the second transistor (low-side transistor) M2 starts to increase from the reference potential GND. At time t7 when the gate-source voltage Vgs2 of the second transistor M2 has increased by its threshold voltage Vth2, the second transistor M2 is turned on and the second current I2 starts to flow through the second transistor M2.

During that course, at time t6, the first current I1 of the transistor M1 becomes zero.

From time t5 to time t6, no flow-through current flows through the first and second transistors M1 and M2 because both of the first current I1 of the first transistor M1 and the second current I2 of the second transistor M2 are zero and a dead time td2=t7−t6 occurs.

FIG. 4 shows a relationship between the dead time and the conversion efficiency of a DC-DC converter. In FIG. 4, symbol a denotes a dead time range of this embodiment and symbol b denotes a dead time range of a comparison example in which a dead time is produced by a delay circuit which utilizes a CR time constant.

As shown in FIG. 4, in the case where the dead time is positive, the body diode of each of the first and second transistors M1 and M2 is turned on during an off-period to cause a loss. Therefore, the DC-DC conversion efficiency decreases gently as the dead time becomes longer.

On the other hand, in the case where the dead time is negative, a flow-through current flows through the first and second transistors M1 and M2 and hence the DC-DC conversion efficiency decreases steeply.

The dead time range b of the comparison example is wide (td>0) because of variations of the turn-on/off delay characteristics of the high-side and low-side transistors and other reasons. On the other hand, the dead time range a of this embodiment is a narrow range around td=0.

The dead time td1 depends on the turn-on delay characteristic of the first transistor M1, the delay characteristic of the second current detecting section 13, the gate delay characteristic of the drive section 14, and the phase-advancing effect obtained by setting the second reference value Iref2 so as to be larger than 0.

Likewise, the dead time td2 depends on the turn-on delay characteristic of the second transistor M2, the delay characteristic of the first current detecting section 12, the gate delay characteristic of the drive section 14, and the phase-advancing effect obtained by setting the first reference value Iref1 so as to be larger than 0.

As a result, by increasing the first reference value Iref1, the phase-advancing effect is increased, and the dead time td2 can be shortened. On the other hand, if the first reference value Iref1 is decreased, the phase-advancing effect is decreased, and the dead time td2 is made longer.

If the first reference value Iref1 is set at zero, the phase-advancing effect of the first reference value Iref1 disappears, as a result of which a dead time occurs which depends on the turn-on delay characteristic of the second transistor M2, the delay characteristic of the first current detecting section 12, and the gate delay characteristic of the drive section 14.

If the first reference value Iref1 is set too large, the phase-advancing effect of the first reference value Iref1 becomes greater than the total effect of the turn-on delay characteristic of the second transistor M2, the delay characteristic of the first current detecting section 12, and the gate delay characteristic of the drive section 14 and the dead time td2 becomes negative. Therefore, a flow-through current occurs.

In consideration of the above-mentioned matter, the first reference value Iref1 is set to smaller than or equal to, for example, $1/100$ of the peak first current Ip1 of the first transistor M1. Alternatively, the first reference value Iref1 may be set in a range of $1/500$ to $1/1000$ of the peak first current Ip1.

Likewise, the dead time td1 can be shortened by increasing the second reference value Iref2. On the other hand, the dead time td1 is made longer if the second reference value Iref2 is decreased.

If the second reference value Iref2 is set at zero, the phase-advancing effect of the second reference value Iref2 disappears, as a result of which a dead time occurs which depends on the turn-on delay characteristic of the first transistor M1, the delay characteristic of the second current detecting section 13, and the gate delay characteristic of the drive section 14.

If the second reference value Iref2 is set too large, the phase-advancing effect of the second reference value Iref2 becomes greater than the total effect of the turn-on delay characteristic of the first transistor M1, the delay characteristic of the second current detecting section 13, and the gate delay characteristic of the drive section 14 and the dead time td1 becomes negative. Therefore, a flow-through current occurs.

In consideration of the above-mentioned matter, the second reference value Iref2 is set to smaller than or equal to, for example, $1/100$ of the peak second current Ip2 of the second transistor M2. Alternatively, the second reference value Iref2 may be set in a range of $1/500$ to $1/1000$ of the peak second current Ip2.

Furthermore, it is possible to make the dead time td2 equal to zero by balancing the total effect of the turn-on delay characteristic of the second transistor M2, the delay characteristic of the first current detecting section 12, and the gate delay characteristic of the drive section 14 with the phase-advancing effect of the first reference value Iref1.

Likewise, it is possible to make the dead time td1 equal to zero by balancing the total effect of the turn-on delay characteristic of the first transistor M1, the delay characteristic of the second current detecting section 13, and the gate delay characteristic of the drive section 14 with the phase-advancing effect of the second reference value Iref2.

Next, a description will be made of a semiconductor integrated circuit of the DC-DC converter 10.

Figure 5:
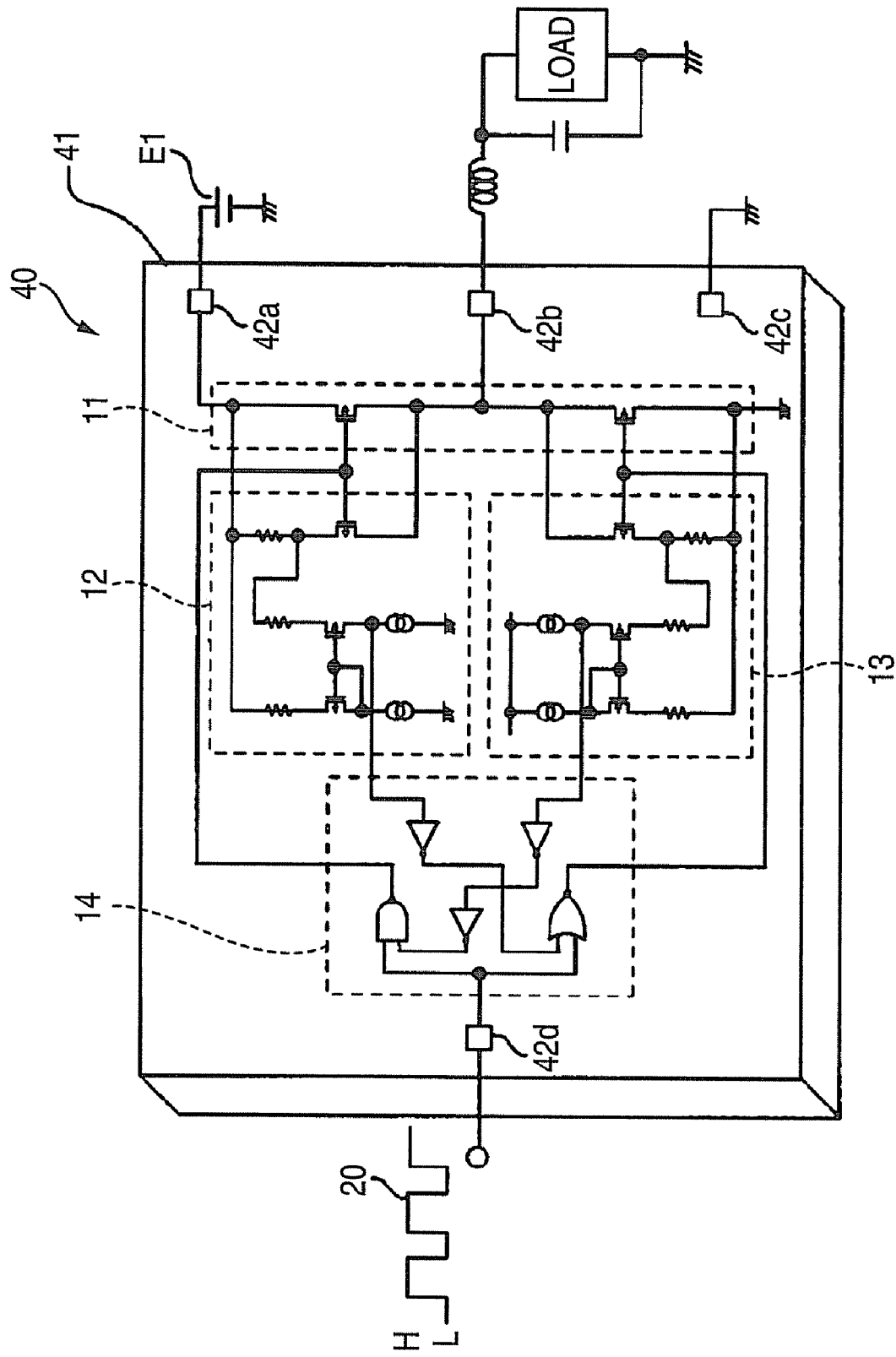
FIG. 5 shows a semiconductor integrated circuit of the DC-DC converter according to the first embodiment.

As shown in FIG. 5, a semiconductor integrated circuit 40 of the DC-DC converter 10 is configured in such a manner that an output section 11 having a series connection of a first transistor M1 and a second transistor M2, a first current detecting section 12 which monitors a first current I1 flowing through the first transistor M1 and outputs a first control signal for turning on the second transistor M2 if the first current I1 becomes smaller than a first reference value Iref1, a second current detecting section 13 which monitors a second current I2 flowing through the second transistor M2 and outputs a second control signal for turning on the first transistor M1 if the second current I2 becomes smaller than a second reference value Iref2, and a drive section 14 which turns off the first transistor M1 and turns on the second transistor M2 in response to the first control signal and also turns off the second transistor M2 and turns on the first transistor M1 in response to the second control signal are integrated monolithically on a single chip 41.

For example, the first transistor M1 and the second transistor M2 of the output section 11 are a p-MOS transistor and an n-MOS transistor, respectively, and thus constitute a CMOS circuit. It is preferable that they be formed in a region that is shielded by a guard ring so that switching noise does not affect nearby circuits.

Bonding pads 42a-42d which are necessary for receiving an external PWM signal 20 and outputs a PWM-controlled output voltage to the outside are formed on the semiconductor chip 41.

As described above, in the DC-DC converter 10 according to this embodiment, the first and second currents I1 and I2 flowing through the first and second transistors M1 and M2, respectively, are monitored. An operation of turning on the second transistor M2 is started immediately before the first current I1 flowing through the first transistor (high-side transistor) M1 becomes zero. And an operation of turning on the first transistor M1 is started immediately before the second current I2 flowing through the second transistor M2 becomes zero.

As a result, the dead times td1 and td2 can reliably be confined in a narrow range around td=0 even if the turn-on/off delay characteristics of the first and second transistors M1 and M2 vary.

Therefore, noise can be reduced and the DC-DC conversion efficiency can be kept high even if the frequency of the PWM signal 20 becomes high. The DC-DC converter 10 can thus be given sufficiently high conversion efficiency.

Although the above description is directed to the case that the first and second reference values Iref1 and Iref2 are identical, they may be different from each other.

This provides an advantage that the dead times td1 and td2 equalized by adjusting the first and second reference values Iref1 and Iref2 in the case where the first and second transistors M1 and M2 have different turn-off delay characteristics.

Although the above description is directed to the case that the first and second transistors M1 and M2 are MOS transistors, they may be bipolar transistors or insulated-gate bipolar transistors (IGBTs).

Where bipolar transistors or IGBTs are used which are not accompanied by body diodes unlike in the case of MOS transistors, it is necessary to add external diodes for bypassing regenerative currents.

Although the above description is directed to the case that the third to eighth transistors of the first and second current detecting sections 12 and 13 are MOS transistors, they may be bipolar transistors.

Although the semiconductor integrated circuit 40 was described above as being such that the first and second transistors M1 and M2 of the output section 11 are integrated monolithically on the single chip 41, the output section 11 may be composed of external, discrete MOS transistors.

Although the turn-on/off delay characteristics of discrete MOS transistors have larger variations than those of integrated MOS transistors, this embodiment is advantageous in not being affected by such variations.

SECOND EMBODIMENT

Figure 6:
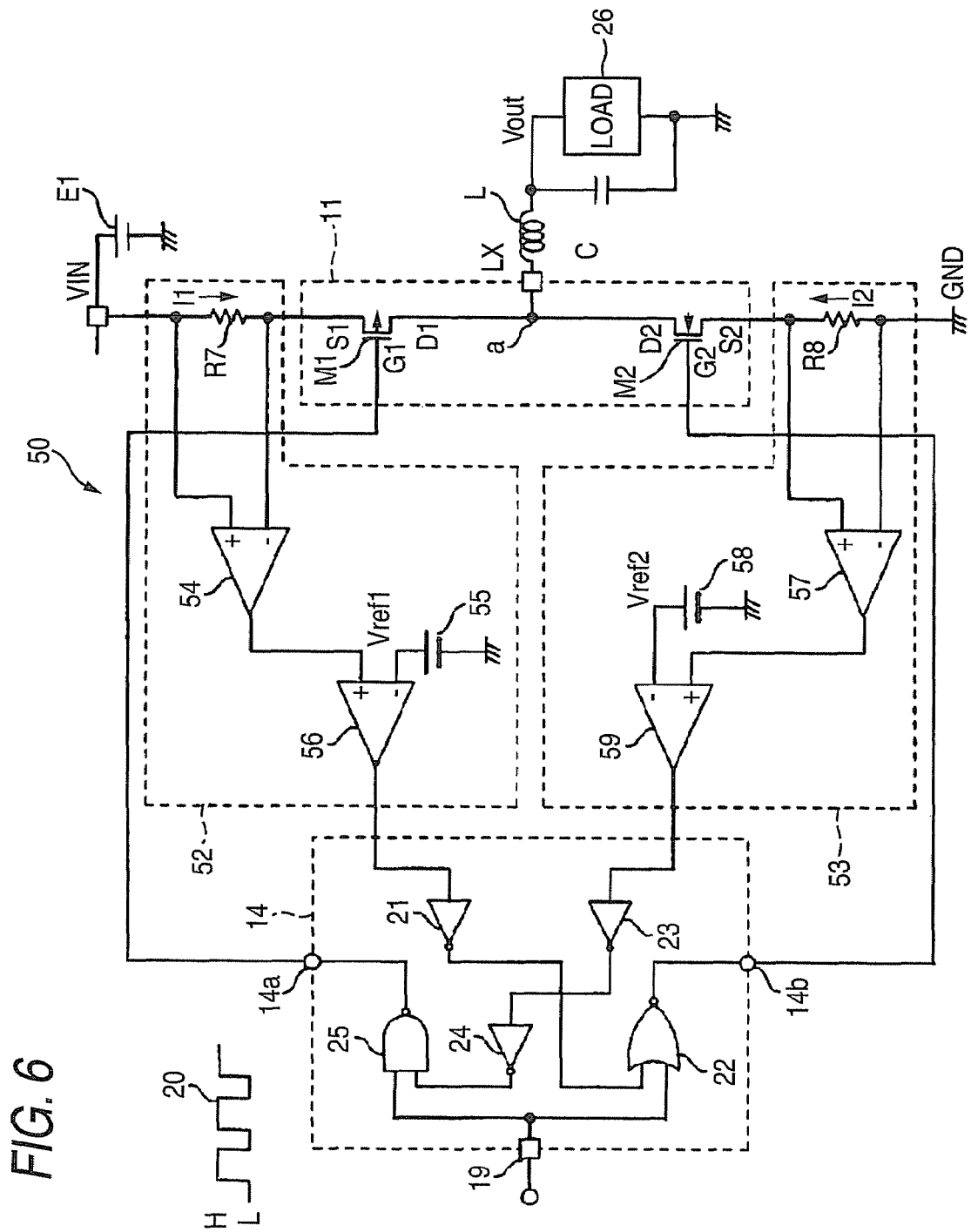
FIG. 6 is a circuit diagram showing the configuration of a DC-DC converter according to a second embodiment.

FIG. 6 is a circuit diagram showing the configuration of a DC-DC converter according to a second embodiment. Components having the same ones in the first embodiment will be given the same reference symbols as the latter and will not be described. That is, only different features will be described.

This embodiment is different from the first embodiment in that the first and second currents flowing through the first and second transistors are detected by using resistors.

More specifically, as shown in FIG. 6, a DC-DC converter 50 according to this embodiment includes a first current detecting section 52 which includes a differential amplifier 54 whose positive and negative input terminals are connected to the two respective ends of a resistor R7 (first current detecting element) for detecting a first current I1 flowing through the first transistor M1, a first reference value generation circuit 55 which outputs a first reference voltage Vref1 according to a first reference value, and a comparator 56 which compares an output of the differential amplifier 54 with the first reference voltage Vref1 and outputs a comparison result to the inverter 21 the drive section 14. The current detecting resistor R7 is connected between the high-potential power supply side and the first transistor M1.

Likewise, the DC-DC converter 50 includes a second current detecting section 53 which includes a differential amplifier 57 whose positive and negative input terminals are connected to the two respective ends of a resistor R8 (second current detecting element) for detecting a second current I2 flowing through the second transistor M2, a second reference value generation circuit 58 which outputs a second reference voltage Vref2 according to a second reference value, and a comparator 59 which compares an output of the differential amplifier 57 with the second reference voltage Vref2 and outputs a comparison result to the inverter 23 of the drive section 14. The current detecting resistor R8 is connected between the low-potential power supply side and the second transistor M2.

Let Ga1 represent the gain of the differential amplifier 54; then, the output voltage of the differential amplifier 54 is given by $I1 \times R7 \times Ga1$. Therefore, by setting the first reference voltage Vref1 equal to $0.01 \times Ip1 \times R7 \times Ga1$, the comparator 56 can detect an instant when the first current I1 flowing through the first transistor M1 becomes smaller than the first reference value Iref1.

Likewise, let Ga2 represent the gain of the differential amplifier 57; then, the output voltage of the differential amplifier 57 is given by $I2 \times R8 \times Ga2$. Therefore, by setting the second reference voltage Vref2 equal to $0.01 \times Ip2 \times R8 \times Ga2$, the comparator 59 can detect an instant when the second current I2 flowing through the second transistor M2 becomes smaller than the second reference value Iref2.

As described above, in the DC-DC converter 50 according to this embodiment, the first and second currents I1 and I2 are converted by the resistors R7 and R8 into voltages, which are compared with the first and second reference voltages Vref1 and Vre2 corresponding to the first and second reference values, respectively. As such, the DC-DC converter 50 is advantageous in that the circuits of the first and second current detecting sections 52 and 53 are simplified.

For example, the DC-DC converter 50 is suitably used within a relatively low current range in which detected current values does not be influenced by parasitic inductances of the resistors R7 and R8.

Although the above description is directed to the case that the first and second current detecting elements are resistors, they are not restricted to any elements as long as they can detect target currents.

THIRD EMBODIMENT

Figure 7:
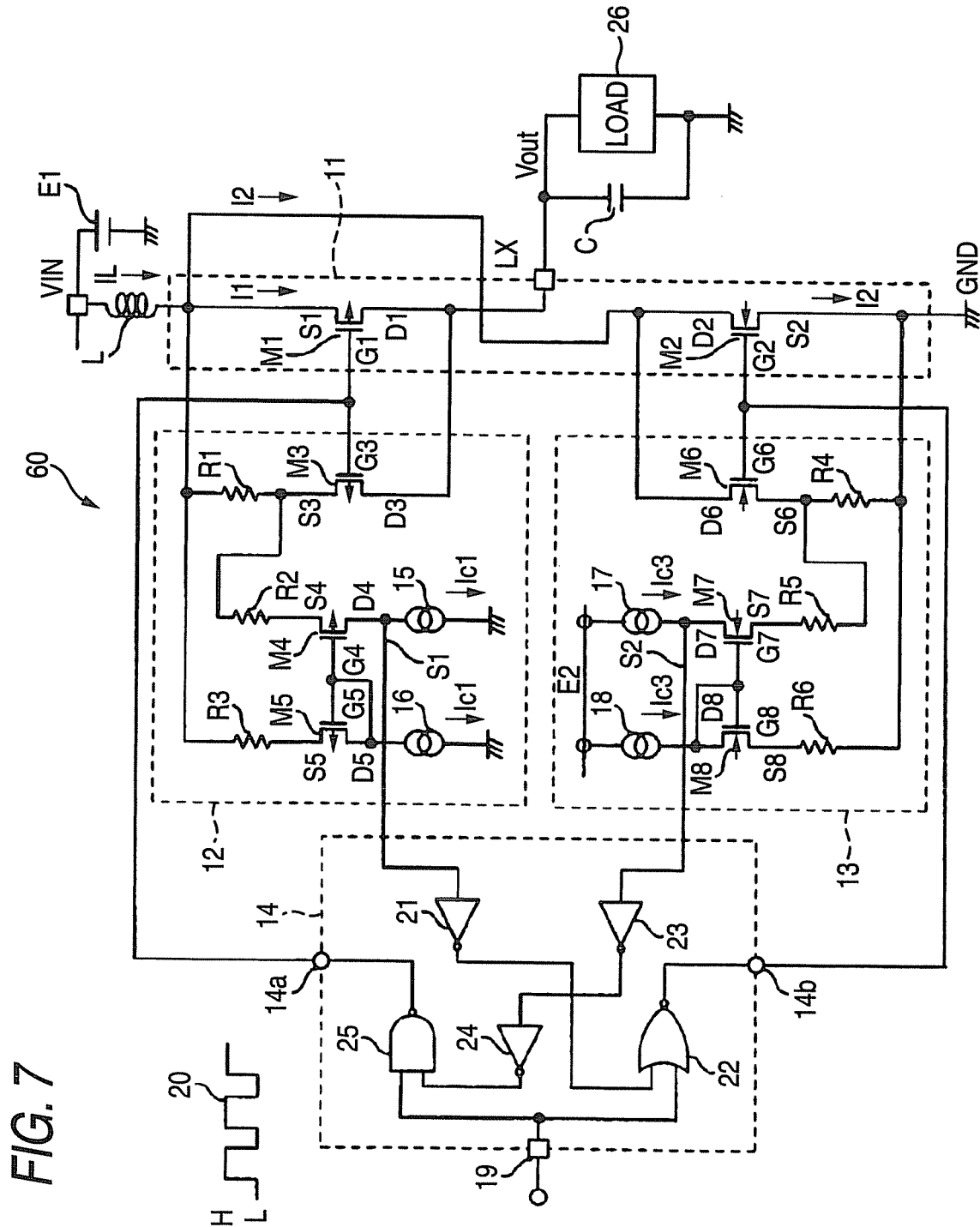
FIG. 7 is a circuit diagram showing the configuration of a DC-DC converter according to a third embodiment.

FIG. 7 is a circuit diagram showing the configuration of a DC-DC converter according to a third embodiment. Components having the same ones in the first embodiment will be given the same reference symbols as the latter and will not be described. That is, only different features will be described.

This embodiment is different from the first embodiment in that the DC-DC converter is of a boost type rather than the step-down type.

More specifically, as shown in FIG. 7, in a DC-DC converter 60 according to this embodiment, the first transistor M1 is connected between the high-potential power supply side and the output terminal LX via an inductor L and the second transistor M2 is connected between the high-potential power supply side and the reference potential GND via the inductor L.

As described above, constructed by using the first and second current detecting sections 12 and 13, the boost type DC-DC converter 60 is advantageous in that the dead times have only small variations and an output voltage that is higher than an input voltage can be obtained stably.

Figure 8A:
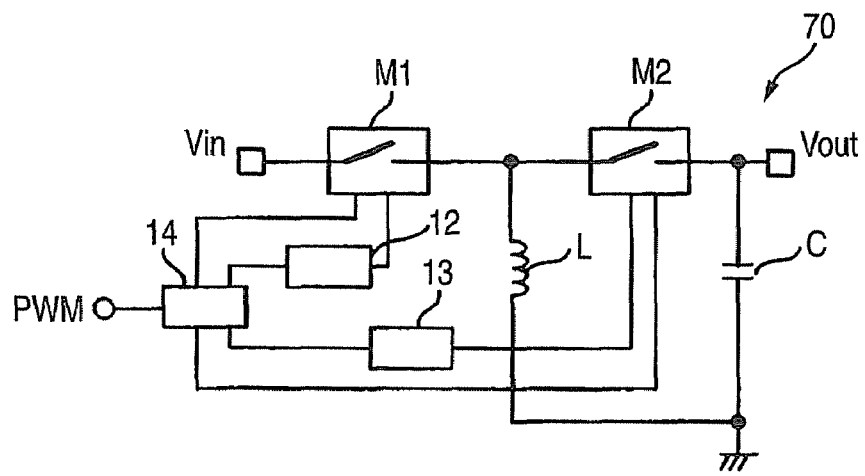
FIG. 8A is a block diagram showing the configuration of another DC-DC converter.
Figure 8B:
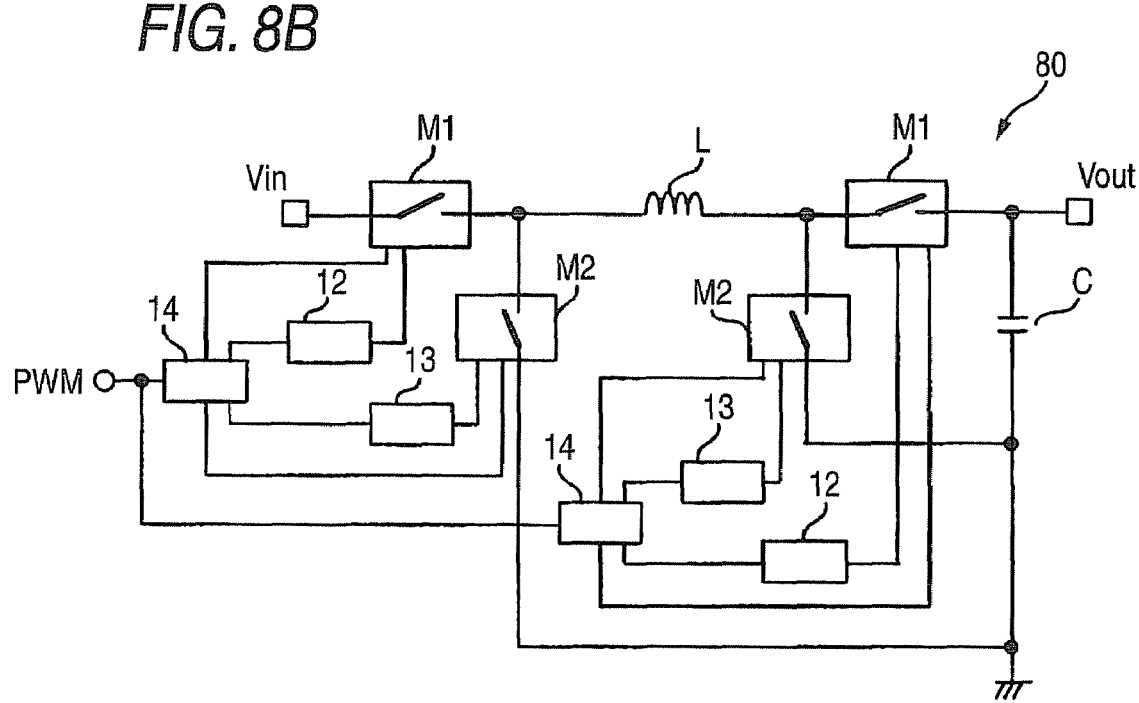
FIG. 8B is a block diagram showing the configuration of still another DC-DC converter.

The above description is directed to the case that the DC-DC converter 60 is of the boost type rather than the step-down type. Alternatively, an inversion type DC-DC converter 70 may be constructed as shown in FIG. 8A. As a further alternative, a boost/step-down type DC-DC converter 80 may be constructed as shown in FIG. 8B.

In the voltage boosting type DC-DC converter 80, two sets of the first current detecting section 12, the second current detecting section 13, and the drive section 14 are connected to a boosting section and a step-down section, respectively.

According to an aspect of the present invention, there is provided a DC-DC converter having sufficiently high conversion efficiency.

What is claimed is:

1. A DC-DC converter comprising:
    a first transistor connected to a high-potential power supply;
    a second transistor connected to a low-potential power supply;
    a first current detector
        that monitors a first current flowing through the first transistor and
        that outputs a first control signal when the first current becomes smaller than a first reference value;
    a second current detector
        that monitors a second current flowing through the second transistor and
        that outputs a second control signal when the second current becomes smaller than a second reference value; and
    a driver
        that turns on the second transistor based on the first control signal and
        that turns on the first transistor based on the second control signal.

2. The DC-DC converter according to claim 1, wherein:
    the first reference value is larger than 0; and
    the second reference value is larger than 0.

3. The DC-DC converter according to claim 1, wherein:
    the first reference value is smaller than or equal to $1/100$ of a peak value of the first current; and
    the second reference value is smaller than or equal to $1/100$ of a peak value of the second current.

4. The DC-DC converter according to claim 1, wherein:
    the first current detector comprises:
        a third transistor whose control electrode and first electrode are connected to a control electrode and a first electrode of the first transistor, respectively, and whose second electrode is connected to a second electrode of the first transistor via a first resistor,
        a fourth transistor whose first electrode is connected to the low-potential power supply via a first constant current source and whose second electrode is connected to the second electrode of the third transistor via a second resistor, and
        a fifth transistor whose first electrode is connected to the low-potential power supply via a second constant current source, whose second electrode is connected to the second electrode of the first transistor via a third resistor, and whose control electrode is connected to its own second electrode and a control electrode of the fourth transistor, and
    the second current detector comprises:
        a sixth transistor whose control electrode and a first electrode are connected to a control electrode and a first electrode of the second transistor, respectively, and whose second electrode is connected to a second electrode of the second transistor via a fourth resistor,
        a seventh transistor whose first electrode is connected to the high-potential power supply via a third constant current source and whose second electrode is connected to the second electrode of the sixth transistor via a fifth resistor, and
        an eighth transistor whose first electrode is connected to the high-potential power supply via a fourth constant current source, whose second electrode is connected to the second electrode of the second transistor via a sixth resistor, and whose control electrode is connected to its own first electrode and a control electrode of the seventh transistor.

5. The DC-DC converter according to claim 1, wherein:
    the first current detector comprises:
        a third transistor,
        a fourth transistor,
        a fifth transistor,
        a first constant current source,
        a second constant current source,
        a first resistor,
        a second resistor, and
        a third resistor;
    the first transistor comprises:
        a first gate electrode,
        a first source electrode, and
        a first drain electrode;
    the third transistor comprises:
        a third gate electrode,
        a third source electrode, and
        a third drain electrode;
    the fourth transistor comprises:
        a fourth gate electrode,
        a fourth source electrode, and
        a fourth drain electrode;
    the fifth transistor comprises:
        a fifth gate electrode,
        a fifth source electrode, and
        a fifth drain electrode;
    the third gate electrode is connected to the first gate electrode;
    the third drain electrode is connected to the first drain electrode;
    the third source electrode is connected to the first source electrode via the first resistor;
    the fourth drain electrode is connected to the low-potential power supply via the first constant current source;
    the fourth source electrode is connected to the third source electrode via the second resistor;
    the fifth gate electrode is connected to the fifth source electrode and to the fourth gate electrode;
    the fifth drain electrode is connected to the low-potential power supply via the second constant current source; and
    the fifth source electrode is connected to the first source electrode via the third resistor.

6. The DC-DC converter according to claim 1, wherein:
    the first current detector comprises:
        a first current detecting element that detects the first current flowing through the first transistor;
        a first reference value generation circuit that outputs the first reference value; and a first comparator that compares the first current with the first reference value; and the second current detector comprises:
a second current detecting element that detects the second current flowing through the second transistor;
a second reference value generation circuit that outputs the second reference value; and
a second comparator that compares the second current with the second reference value.

7. The DC-DC converter according to claim 1, wherein:
the first current detector comprises:
a first voltage source that generates a first reference voltage;
a first resistor connected between the high-potential power supply and the first transistor;
a first comparator to which a voltage supplied on the first resistor is input; and
a second comparator to which an output of the first comparator and the first reference voltage are input.

8. The DC-DC converter according to claim 7, wherein:
the first current detector outputs an output of the second comparator as the first control signal.

9. The DC-DC converter according to claim 8, wherein:
the first resistor has a resistance of R7;
the first comparator has a gain of Ga1;
the first current has a peak value of Ip1;
the first reference voltage is Vref1; and
Vref, Ip1, R7 and Ga1 satisfy $Vref \leqq 0.01 \times Ip1 \times R7 \times Ga1$.

10. A DC-DC converter comprising:
an inductor;
a first transistor connected to a high-potential power supply via the inductor;
a second transistor connected to a low-potential power supply;
a first current detector
that monitors a first current flowing through the first transistor and
that outputs a first control signal when the first current becomes smaller than a first reference value;
a second current detector
that monitors a second current flowing through the second transistor and
that outputs a second control signal when the second current becomes smaller than a second reference value; and
a driver
that turns on the second transistor based on the first control signal and
that turns on the first transistor based on the second control signal.

11. A DC-DC converter comprising:
a first transistor connected to a high-potential power supply;
a second transistor connected to a low-potential power supply;
a receiver that receives:
a first signal capable of turn off the first transistor and turn on the second transistor, and
a second signal capable of turn off the second transistor and turn on the first transistor;
a first path that transmits the first signal from the receiver to the second transistor via the first transistor; and
a second path that transmits the second signal from the receiver to the first transistor via the second transistor;
wherein:
the first path comprises:
a first delaying element that delays an transmission of the first signal, and
a first phase-advancing element that advances the transmission of the first signal; and
the second path comprises:
a second delaying element that delays an transmission of the second signal, and
a second phase-advancing element that advances the transmission of the second signal.

12. The DC-DC converter according to claim 11, wherein:
the first delaying element delays the transmission of the first signal based on a delay characteristic of a device of the first path; and
the second delaying element delays the transmission of the second signal based on a delay characteristic of a device of the second path.

13. The DC-DC converter according to claim 12, wherein:
the first phase-advancing element
monitors a first current flowing through the first transistor and
transmits the first signal when the first current becomes smaller than a first reference value;
the second phase-advancing element
monitors a second current flowing through the second transistor, and
transmits the second signal when the first current becomes smaller than a first reference value.

14. The DC-DC converter according to claim 13, wherein:
the first reference value is larger than 0; and
the second reference value is larger than 0.

* * * * *